United States Patent [19]

Roseman et al.

[11] 4,401,204
[45] Aug. 30, 1983

[54] ASSEMBLY SYSTEM FOR LOADING GLASS SHEETS OF DIFFERENT SIZE ON A CONVEYOR

[75] Inventors: Michael P. Roseman, Pittsburgh, Pa.; Richard C. Eames, Dallas, Tex.; Marlin W. Barrett, Bethel Park, Pa.

[73] Assignee: PPG Industries, Inc., Pittsburgh, Pa.

[21] Appl. No.: 228,421

[22] Filed: Jan. 22, 1981

[51] Int. Cl.³ .................................................. B65G 47/26
[52] U.S. Cl. .................................... 198/431; 198/358; 198/366; 198/434; 198/617; 270/58
[58] Field of Search .............. 198/357, 358, 366, 370, 198/434, 444, 448, 457, 611, 613, 782, 431, 374, 617; 193/35 SS, 35 MD; 271/184, 225; 270/58; 53/531, 543, 544

[56] References Cited

U.S. PATENT DOCUMENTS

| | | | |
|---|---|---|---|
| 2,997,187 | 8/1961 | Burt | 198/374 |
| 3,011,621 | 12/1961 | Byrnes et al. | 198/358 |
| 3,075,327 | 1/1963 | Kimble et al. | 198/445 |
| 3,247,981 | 4/1966 | Johnson | 198/611 |
| 3,314,554 | 4/1967 | Cuniberti | 198/434 |
| 3,493,095 | 2/1970 | Messerly | 198/357 |
| 3,512,625 | 5/1970 | Raynor et al. | 198/419 |
| 3,554,351 | 1/1971 | Rothenbach et al. | 198/420 |
| 3,701,408 | 10/1972 | Northsea | 198/444 |
| 3,762,907 | 10/1973 | Quinn et al. | 65/164 |
| 3,905,793 | 9/1975 | Croughwell | 65/163 |
| 3,921,789 | 11/1975 | Goldinger et al. | 198/782 |
| 4,004,904 | 1/1977 | Fergusson | 65/158 |
| 4,073,387 | 2/1978 | Bowser | 214/6 P |
| 4,120,403 | 10/1978 | Stephanos | 209/564 |
| 4,157,408 | 6/1979 | Lingl | 427/209 |
| 4,161,368 | 7/1979 | Batzdorff | 414/114 |

*Primary Examiner*—Joseph E. Valenza
*Attorney, Agent, or Firm*—Edward I. Mates

[57] ABSTRACT

An assembly system for loading glass sheets of different size on a conveyor that comprises a plurality of loading tables for assembling a group of consecutive or non-consecutive glass sheets on any selected one or other of said loading tables. The formed group of glass sheets has a greater density than that of a group formed by assembling consecutive glass sheets of different size onto a single loading table. Means is provided to transfer each group of glass sheets when completed onto a treatment conveyor without disturbing the arrangement of the glass sheets within said group.

8 Claims, 1 Drawing Figure

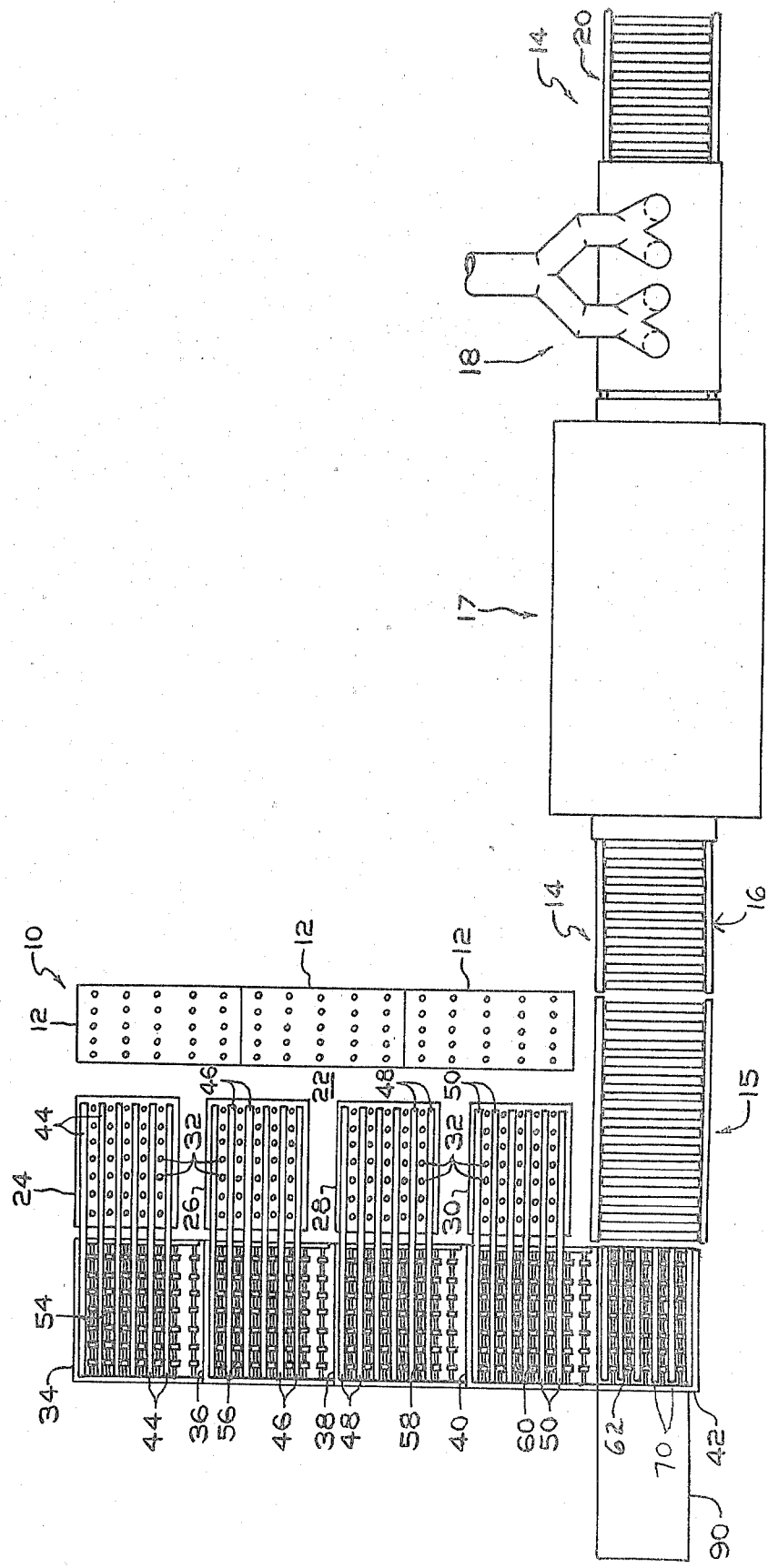

ASSEMBLY SYSTEM FOR LOADING GLASS SHEETS OF DIFFERENT SIZE ON A CONVEYOR

BACKGROUND OF THE INVENTION

1. Field of the Invention

The present invention relates to an assembly system for loading glass sheets of different size on a conveyor. When glass sheets are treated while conveyed on a conveyor, particularly of the roller type, it is desirable to load the sheets as closely as possible to one another while leaving some space to insure that the sheets do not bump into one another during their conveyance and cause chipping along the edges. Another reason for leaving some space between adjacent glass sheets occurs when the glass is thermally treated. It is necessary that the edges of the glass be separated so as to improve the heating uniformity throughout the extent of the glass sheet and if the glass sheets are subsequently cooled, it is also desirable to have some space around the edge of the glass to facilitate a more desirable pattern of cooling.

When glass sheets of uniform size are treated, consecutive sheets are loaded onto a conveyor by arranging the sheets so that their dimensions are correlated to the width of the conveyor and the rate of conveyor speed so that either a single sheet or a transversely extending row of glass sheets is loaded at a given interval of time to insure that the sheets are arranged with the proper longitudinal spacing commensurate with maximum loading per unit area of conveyor. However, when sheets of different size and/or outline shapes are mixed with one another for treatment, it becomes more difficult to load a conveyor efficiently. In a typical operation where glass sheets are conveyed to a furnace and brought to a temperature that is sufficient for subsequent treatment, such as quenching, coating, or other treatments required to fabricate a finished glass sheet further, as much as 50 percent or more of the area of the furnace has been wasted by loading sheets having a random size assortment consecutively onto a loading station at the entrance end of the furnace conveyor and periodically discharging the loading station.

It would be beneficial for the glass fabrication industry to improve the efficiency of operation. Until now, while the flat glass sheet industry has been able to improve the efficiency of cutting rectangular blanks into smaller sheets of different size and outline shape with minimum glass waste, it has been unable to improve the efficiency of operation of roller hearth furnaces when the furnaces were called upon to simultaneously treat glass sheets of different sizes and pattern outlines. This art needed technology that would make more efficient use of a treatment conveyor when the latter handles a variety of glass sheets having different sizes and/or outline shapes.

2. Description of Patents of Interest

U.S. Pat. No. 3,512,625 to Raynor et al. discloses an article accumulation and transfer apparatus comprising an article conveyor having a row forming section and a transfer section, wherein successive rows comprising a predetermined number of identical articles are formed at the row forming section and are transferred as a row to a transfer conveyor. The patented apparatus does not treat non-indentical articles.

U.S. Pat. No. 3,554,351 to Rothenback et al. discloses apparatus for lining up objects that are irregularly spaced along two or more rows. This apparatus is concerned with making combined packages each comprising objects from each row or from one of said rows.

U.S. Pat. No. 3,701,408 to Northsea discloses a method of handling boards of different dimensions while providing for exclusion of rejects. The acceptable boards are arranged in pairs or sets.

U.S. Pat. No. 3,762,907 to Quinn et al. refers to machines for forming hollow glass articles from molten glass where the operation is electronically controlled. The hollow glass articles that are formed are identical.

U.S. Pat. No. 3,905,793 to Croughwell discloses an improved machine for forming glassware over that of the Quinn et al patent. The improved system has digital computer control for making hollow glass articles.

U.S. Pat. No. 4,004,904 to Ferguson provides a system for identifying defective glass containers that are formed in a line and transferred from said line to successive rows for conveyance purposes. Means is provided to separate the defective glass containers so identified.

U.S. Pat. No. 4,073,387 to Bowser relates to forming a tier of many rows in such a manner as to avoid skewing of individual rows.

U.S. Pat. No. 4,120,403 to Stephanos relates to a photoelectric sensing apparatus to sense the size of different sized articles in a population of variegated articles and is provided with means for removing articles of different sizes onto different collection devices.

U.S. Pat. No. 4,157,408 to Lingl discloses a system for hacking glazed or unglazed tiles that accomplishes continuous hacking of either glazed or unglazed split tiles by feeding pallets into one or another of two conveyor systems without interrupting the tile manufacturing process.

U.S. Pat. No. 4,161,368 to Batzdorff discloses a brick blending apparatus wherein bricks having different characteristics are delivered to different staging areas in rows of spaced bricks and the rows are blended in a blending area to provide a blended array of bricks.

None of the patents cited relate to the present problem of forming groups of spaced glass sheets of different sizes and/or shapes that minimize waste area in a given area occupied by a diverse group that is to be transported along a conveyor through a treatment area.

SUMMARY OF THE INVENTION

The present invention relates to a method and apparatus for loading a treatment conveyor more efficiently with sheets of different size and/or outline. In particular, this invention enables an operator to simultaneously form groups of glass sheets, some of which have different shapes, sizes, and outlines, from a population of glass sheets and to have each group so formed occupy a larger proportion of a given surface area taken from a plurality of alternate surface areas of the same size than is possible when only a single group of sheets is formed from consecutive sheets on a single given surface area. When the group occupies said larger proportion of said given surface area, it is transferred as a unit to a treatment conveyor so as to minimize the loss of space when the group of glass sheets is transferred onto the treatment conveyor.

Glass sheets of various sizes and shapes are received at a delivery station. A plurality of discrete loading tables, each defining a given surface area congruent to the given surface areas of the rest of said loading tables, are aligned transversely of one another. Each loading table is longitudinally aligned with a cornering table.

The corresponding cornering tables serve as cross-conveyor sections that are aligned in transverse adjacency to one another to form a transverse row of cornering tables. An end corner table is in transverse alignment with an end of the row of transversely adjacent cornering tables and in longitudinal alignment with a longitudinally extending treatment conveyor along which glass sheets are conveyed during treatment in an arrangement of consecutive groups, each having less wasted space than was experienced in the prior art.

The delivery station preferably comprises one or more elongated caster tables onto which sheets of different size are delivered. Adjacent the delivery station are several loading tables, which may range in number from two to six or more, and preferably, four loading tables are included. An operator transfers each glass sheet from the caster table onto one or another of the loading tables. Since it is desired to avoid glass sheet breakage, it is necessary to load the glass sheets in spaced relation to one another. A spacing of one inch (2.5 centimeters) to two inches (five centimeters) is preferred between the edges of adjacent glass sheets mounted on each of the loading tables and between the outer edge of the group and the adjacent edge of the loading table to insure adequate heating of the glass sheet edges in a furnace and adequate edge cooling in a cooling area to insure a desired cooling pattern when sheets loaded according to this invention are subjected to thermal treatment required for tempering or heat strengthening the glass to at least a partial temper. The operator loads each glass sheet onto one or another of the loading tables, and when any one of the loading tables has sufficient glass sheets in a group mounted thereon until said group occupies a larger proportion of a given surface area defined by said any one of said loading tables than is possible when glass sheets of random size are loaded consecutively onto only a single one of said loading tables defining said given surface area to satisfy the requirement to limit the wasted space within the area of the loading table, the group of glass sheets is transferred in a longitudinal direction from the loading table to a cornering table associated therewith, and the unloaded loading table becomes available for additional loading concurrently with the other loading tables.

A series of narrow transfer belts is provided across the longitudinal dimension of each loading table and its associated cornering table. Means is provided to support the upper runs of the transfer belts at a given level to transfer the completed group of glass sheets occupying said larger proportion of said given surface area of one of the loading tables to the associated transfer table longitudinally aligned with the loading table containing a completed group. The cornering tables are provided with donut rolls mounted on longitudinal shafts intermediate the narrow transfer belts so that when a group of glass sheets is delivered to a cornering table, the transfer belts are stopped and the donut rolls lifted in unison to raise the glass sheets as a group onto the donut rolls. The latter rotate while lifted to transfer the glass sheets as a group without impairing its configuration along the transverse row of cornering tables to an end corner table using well known ladder logic to prevent two glass groups from occupying the same table at the same time. The end corner table is located at one transverse end of the transverse row of cornering tables and in longitudinal alignment with the treatment conveyor. The area of support provided by each of the loading tables and the end corner table is substantially congruent to that of each other so as to insure that the compact loading arrangement of the group of glass sheets onto any one of the loading tables is maintained when the group is transferred onto the treatment conveyor.

The choice of several loading tables for loading each of the glass sheets enables an operator to form several groups simultaneously and, while doing so, to minimize the amount of open space in each group of glass sheets supported on any of the loading tables. Therefore, the arrival of a glass sheet too large or bulky to fit into the remaining area on one loading table does not require the premature discharge of the group formed on the aforesaid single loading table onto the treatment conveyor. Instead, the large or bulky glass sheet can be loaded onto another loading table that has space available for the newly arrived sheet. In other words, an operator can load either consecutive or non-consecutive glass sheets onto any available loading table to assemble more compact groups composed of individual sheets that occupy a larger proportion of the given surface area of a loading table than the proportion of said given surface area that sheets of random size can occupy when they are loaded consecutively onto a single loading table.

The loading tables are transversely spaced from one another sufficiently to enable the operator to have access to load each loading table. The cornering tables are sufficiently wider than the loading tables to insure that the transverse row of cornering tables provides a continuous row of transverse conveyor sections to the end corner table.

The treatment conveyor has a given width and the loading tables and end corner table have a transverse dimension approximating said given width. The end corner table has a longitudinal dimension of a given length and the loading tables and cornering tables have longitudinal dimensions approximating said given length. Thus, the glass sheets in a group of desired greater density within an area of said given length and given width can be transferred as a group from one of said loading tables onto its longitudinally aligned cornering table and thence onto said end corner table and then onto the treatment conveyor to deliver the glass sheets in a group in said arrangement within an area congruent to the area of the loading table.

While the present invention has been developed for the purpose of loading glass sheets most efficiently for use in a treatment conveyor that conveys glass sheets through a tunnel-like furnace for heat treatment preparatory to further treatment of the glass, it is also understood that the present invention is also suitable for use in arranging rigid sheets of different outlines, shapes and sizes for transport as efficiently as possible along a horizontally disposed conveyor for any treatment purpose desired.

The present invention will be better understood in light of a description of a preferred embodiment that follows.

BRIEF DESCRIPTION OF THE DRAWING

The drawing represents a schematic plan view of a preferred embodiment of the present invention for handling groups of non-uniformly sized and/or shaped glass sheets so as to deliver them to a treatment conveyor with minimum loss of conveyor space.

DESCRIPTION OF THE PREFERRED EMBODIMENT

With reference to the drawing, a preferred embodiment of the present invention comprises a delivery station 10 which may comprise one or more elongated caster tables 12 arranged transversely of one another to provide a delivery station for receipt of glass sheets that have been cut to different outlines, sizes and shapes from larger blanks of glass. The caster tables 12 support an array of inverted casters at a level convenient for handling by an operator. The array of casters is provided to provide rolling support for glass sheets to facilitate their movement both longitudinally and transversely of the delivery station and are supported in a substantially horizontal plane of support.

While other specific arrangements of apparatus elements comprising the present invention may be made depending on availability of space in the building the apparatus occupies, the delivery station 10 of a preferred embodiment is located to one side of an elongated treatment conveyor 14 which is used to handle or treat a plurality of glass sheets and which may comprise several stages. In the preferred embodiment where sheets are provided thermal treatment, the treatment conveyor 14 extends through a first stage or washer 15, a second stage or loading station 16, a single or multi-stage tunnel-type furnace 17 and a cooling station 18 which is followed downstream by an additional cooling area 20 to an unloading and inspection area (not shown). The length of the treatment conveyor 14 will be used to define the longitudinal dimension and its width to define a transverse dimension of any path taken by glass sheets during their loading and arrangement according to the details of the present invention to be described in further detail herein.

Adjacent and to the left of the position occupied by the caster tables 12 of the delivery station 10 there is a work station 22 occupied by an operator. This work station has a transversely extending main portion parallel to the entire length of the caster tables and also has longitudinal finger-like areas extending to the left of the main portion. A plurality of transversely spaced loading tables 24, 26, 28 and 30 extend in the longitudinal direction. Each of the loading tables is provided with a plurality of casters 32 arranged in transversely spaced rows extending longitudinally. The casters 32 are movable vertically in unison for each loading table between a raised position in horizontal alignment with the casters on the caster table 12 and a lowered position.

To the left side of each of the loading tables 24, 26, 28 and 30, there is a corresponding cornering table 34, 36, 38 and 40. The upstream lateral side of each cornering table is longitudinally aligned with the corresponding upstream lateral side of its corresponding loading table. However, the downstream lateral side of each cornering table is located adjacent the upstream lateral side of the next cornering table to provide a continuous cross conveyor with the other cornering tables. In other words, the work area 22 does not extend beyond the longitudinal ends of the loading tables.

An end corner table 42 is located transversely adjacent cornering table 40. Its purpose will be explained later.

The loading table 24 and its corresponding cornering table 34 have a common belt conveyor system 44. A similar common belt conveyor system 46 is provided for loading table 26 and its corresponding cornering table 36. Another common belt conveyor system 48 is provided for loading table 28 and its cornering table 38, and a fourth belt conveyor system 50 is provided for loading table 30 and its corresponding cornering table 40. The upper runs of the belts of each of the belt conveyor systems extend longitudinally between adjacent rows of casters 32 across the length of the loading tables and continue longitudinally across the cornering tables. The upper runs normally lie in a common plane intermediate the raised and lowered positions occupied by the casters 32.

Cornering table 34 is provided with a cross conveyor section 54 having donut rolls mounted on horizontal longitudinal shafts, cornering table 36 is provided with a similar donut roll cross conveyor section 56, cornering table 38 is provided with a similar cross conveyor section 58, and cornering table 40 is provided with a similar cross conveyor section 60. The donut rolls are supported in a horizontal plane for rotation about horizontal, longitudinally extending shafts and are aligned in longitudinal rows with the longitudinal rows of casters 32 provided on the loading tables 24, 26, 28 and 30.

The donut rolls of the cross conveyor sections 54, 56, 58 and 60 are arranged in longitudinal rows, some of which extend between adjacent belts of the belt conveyor systems 44, 46, 48 and 50 and others that provide consecutive rows of donut rolls between adjacent belt conveyor systems. The donut rolls of the various cross conveyor sections cooperate to form parts of a cross conveyor. The doughnut rolls of each cross conveyor section are aligned in horizontal planes and move vertically in unison between a raised position above the upper runs of the common belt conveyor systems and a lowered position below said upper runs.

Each said belt conveyor system is provided with an independent drive to transfer a completed group of glass sheets from a loading table to a longitudinally adjacent cornering table. This transfer does not take place unless the associated casters 32 and the donut rolls of the associated cross conveyor sections 54, 56, 58 or 60 are lowered.

The end corner table 42 has the same outline dimensions of given length and given width as each of the loading tables 24, 26, 28 and 30 and is located laterally downstream and adjacent to the downstream lateral side of cornering table 40. A cross conveyor section 62 comprising donut like rolls as in the other cross conveyor sections 54, 56, 58 and 60 is provided for the end corner table 42 to extend the cross conveyor. A belt conveyor 70 is also provided for the end corner table. Each cornering table and the end corner table has a motor drive (not shown) that actuates the donut rolls of the individual cross conveyor section to which it is matched in addition to the motor drive (also not shown) that actuates the belt conveyor system for the corresponding table. The donut rolls for the cross conveyor section 62 of end corner table 42 are vertically movable with the donut rolls of the other cross conveyor sections 54, 56, 58 and 60 between a raised position in horizontal alignment with the raised position of the other donut rolls of the other cross conveyor sections and a lowered position. The raised positions of the donut rolls of the cross conveyor sections may be reached either simultaneously or in sequence as desired. The belt conveyor system for end corner table 42 is supported at a fixed level for the upper run of the belts that is intermediate the raised and lowered positions occupied by the donut rolls of the cross conveyor section 62.

The conveying elements such as the belts of any of the belt conveyor systems or the doughnut rolls of any two adjacent tables move in unison at a common speed in a common plane while transferred a group of glass sheets from one table to an adjacent table. This measure insures that there is no substantial change of arrangement of glass sheets within a group during transfer from one table to an adjacent table.

Each belt conveyor system 44, 46, 48 and 50 may also be individually actuated by a button switch operated manually by an operator when a group of glass sheets is completed on a particular loading table 24, 26, 28 or 30. A programmable controller (not shown), such as a Modicon Model 384B, is used to transfer each completed glass group from a given loading table 24, 26, 28 or 30 onto its longitudinally adjacent cornering table 34, 36, 38 or 40 and thence to end corner table 42 and onto the treatment conveyor 14. Since the details of the programmable controller do not form part of the present invention and programmable controllers are available commercially and their ability to control sequences of operations are well known, this disclosure will describe only the program controlled by the programmable controller. Suffice it to say that the programmable controller is adjusted to operate in such a manner that the first stage 15 of the treatment conveyor 14 must be empty of a glass group before the belt conveyor system 70 transfers a completed group of glass sheets from the end corner table 42 onto the first stage 15 of the treatment conveyor 14.

The programmable controller will inhibit the transfer of a group of glass sheets from cross conveyor section 60 of cornering table 50 onto cross conveyor 62 of end corner table 42 until such time as end corner table 42 is completely clear. Similarly, loading table 30 will not discharge a group onto cornering table 40 unless the cornering table 40 is clear and the casters 32 and the donut rolls of cross conveyor section 60 are in their lowered position. Furthermore, the programmable controller is so adjusted that it does not permit a group of glass sheets to enter cornering table 40 from cornering table 38 or from loading table 30 when cornering table 40 is occupied. Similarly, a group of glass sheets cannot transfer onto cornering table 38 from cornering table 36 or from loading table 28 unless cornering table 38 is unoccupied. Furthermore, there is no transfer permitted onto cornering table 36 from either cornering table 34 or loading table 26 unless cornering table 36 is unoccupied. In addition, if cornering table 34 is still occupied with a glass group when a button is depressed to actuate the belt conveyor system 44 to transfer a completed group of glass sheets from loading table 24 to cornering table 34, the operation of the belt conveyor system 44 is delayed until such time as the cornering table 34 becomes unoccupied. Thus, the programmable controller is capable of providing a system of moving any selected, completed group of glass sheets in its entirety in any desired sequence from any one of the loading tables 24, 26, 28 or 30 onto its associated cornering table 34, 36, 38 or 40 or from one cornering table to another cornering table transversely adjacent thereto and thence to the end corner table 42 whenever the end corner table 42 or a transversely downstream cornering table 40, 38, or 36 is clear.

When a group of glass sheets on any loading table is completed to occupy a proportion of the given surface area defined by the loading table that exceeds the proportion that would be occupied by a group of glass sheets loaded consecutively onto only a single loading table, thereby attaining a goal sought by the operator, the latter presses a button for that loading table, (say, loading table 24) which, when the associated conveying table (say, cornering table 34) is clear, causes the casters 32 on table 24 and the donut rolls of cross conveyor section 54 to lower to allow the belt conveyor system 44 to move the group longitudinally a distance sufficient to transfer the group of glass sheets from the position over loading table 24 to a corresponding position over cornering table 34. Since the belts of the belt conveyor system 44 move in unison, they maintain the arrangement of the glass sheets in the group during its transfer. The donut rolls of the cross conveyor section 54 are lifted to support the group of glass sheets. If cornering table 36 is clear, the raised donut rolls of cross conveyor sections 54 and 56 rotate to transfer the group of sheets to a corresponding position over cornering table 36. This procedure is repeated for cross conveyor section 58 as long as the cornering table 38 is clear or becomes clear, and repeated again for cross conveyor section 60 if cornering table 40 is or becomes clear and repeated once more for cross conveyor section 62 to transfer the group of sheets from cornering table 40 to end corner table 42. However, should one of the cornering tables or the end corner table 42 downstream of the cross conveyor 54, 56, 58, 60, or 62 be loaded with a group of glass sheets, the programmable controller causes the motor for the cornering table immediately upstream of and transverse to one already occupied by a group to stop running its associated donut rolls from the time the cornering table receives a transferred group until such time as the downstream table is cleared to permit transfer of a succeeding group of sheets thereto. It will be understood that whenever any of the cornering tables transversely upstream of the end corner table 42 is also occupied by a group of glass sheets, it will inhibit movement of the next group of glass sheets thereinto. This inhibition also prevails when attempting to unload a loading table onto its associated cornering table when a group occupies the latter. Suitable interlocks are available in the programmable controller to prevent a second group of glass sheets from entering an occupied cornering table or the end corner table, if occupied. Since the details of such interlock systems are readily available in commercially available apparatus and do not form part of the present invention, they are not described in this specification.

Glass sheets arriving at the delivery station 10 have already been cut to size and their edges have been ground and seamed. The operator then rolls the arrived glass sheet over the casters on the caster table 12 to help transfer each of the arriving glass sheets onto any one of the four loading tables 24, 26, 28 or 30. The loading tables are loaded in such a manner as to provide a 2.5 to five centimeter spacing between the first glass sheet to be loaded onto a loading table and the marginal edge of the loading table and 2.5 to five centimers spacing between the edges of adjacent glass sheets mounted on the loading table. Each glass sheet is loaded onto a selected one of the loading tables that will permit the table to be loaded as closely as possible and form a completed group as quickly as possible. A glass sheet that is too large to fit with a group being formed on one loading table is loaded onto another loading table.

The optimum number of loading tables for any given operation depends on the area and length to width ratio of the sheets to be processed. Generally, a smaller number of loading tables suffices for smaller sheets.

The provision of four loading tables has been found to be optimum for the range of sizes usually ordered in the custom market for architectural glass. Two to more than six loading tables, for example, each with its corresponding cornering table, may be provided with a single end cornering table in order to obtain the results desired of the present invention, namely a succession of groups of densely arranged glass sheets fed to the treatment conveyor 14. Too many sets of loading tables and cornering tables are discouraged because of the desire to limit capital costs.

If the glass sheets are loaded directly onto a single loading table at the entrance to the furnace 17 or to a single loading table for a washing apparatus or furnace, the operator would not have any discretion in loading. A single large sheet arriving may require a separate loading table from that occupied by an incomplete group. By providing a selection among several tables, a larger sheet can be assigned to a different loading table pending the arrival of additional sheets that may be fitted therewith. Consequently, the provision of several alternate loading tables from which to choose makes possible an arrangement of more closely spaced sheets within the groups relative to one another throughout the area of each loading table on which the groups of glass sheets are loaded. The closer arrangement of glass sheets within individual groups that are introduced into the treatment conveyor via the end corner table 42 at uniform time intervals results in less waste area within the treatment conveyor.

Prior to the present invention in the treatment of glass sheets of random size using a single loading table such as loading station 16 or one located at end corner table 42 provided as little as less than 50 percent efficiency in the use of the furnace area. The present illustrative embodiment with four loading tables increased the average efficiency to the order of 70 percent. When used with glass sheets of uniform size, the additional loading tables were superfluous, so that the present invention has special utility in handling glass sheets of different random sizes and/or outline shapes where it becomes possible to assemble a group of either consecutive or non-consecutive glass sheets on any loading table of the plurality of loading tables made available by the present invention.

The specific embodiment of the present invention can also operate with glass sheets of the same size and outline shape. In such a case, the embodiment may use an auxiliary caster table 90 for edging glass sheets of uniform size and shape for delivery directly to the treatment conveyor 14 over the end corner table 42 using the belt conveyor system 70 in an otherwise conventional manner whenever there is no need to use the multiple table loading concept of the present invention. It is also possible to load such sheets directly onto loading table 24.

While the specific embodiment of the present invention just described involves moving groups of glass sheets in an initial longitudinal direction that is the opposite of the longitudinal direction of the path of movement along the treatment conveyor, it is understood that the building housing the apparatus may be so arranged that the assembly system of the present invention must be constructed so that each loading table is located upstream of its associated cornering table for transfer thereto in a longitudinally downstream direction having the same vector as that of the path of the treatment conveyor. As long as the cross-conveyor formed by the cornering tables and the end corner table provides a path that is normal to both the parallel longitudinal paths common to the loading tables and their longitudinally aligned cornering tables and the path of the treatment conveyor, it remains possible to deliver the group of glass sheets without changing the arrangement of the sheets within the group. If the glass sheet groups were moved to change directions other than 90 degrees, the conveying rolls and belts would become too complicated in construction for easy maintenance, a characteristic of this invention. Furthermore, if the groups of glass sheets are mounted on tables that rotate to change the direction of movement of the glass sheet group, the rotation of the table may cause the individual glass sheets in a group to slide relative to one another and cause edge chipping in case of collisions. Combining a series of straight line movements at right angles to one another enables the group of glass sheets to move through the treatment conveyor in the same arrangement as that existing when the sheets are loaded individually on the loading tables.

The present description represents an illustrative preferred embodiment of the present invention. It is understood that various changes may be made without departing from the gist of the invention as defined in the claimed subject matter which follows:

We claim:

1. A method of arranging randomly dimensioned sheets to provide a more efficient use of the surface area of a treatment conveyor by forming groups of sheets in non-contacting arrangement for feeding said groups to a treatment conveyor in such a manner that the sheets comprising said groups occupy a greater proportion of a given surface area along said treatment conveyor than when said sheets of random dimensions are fed consecutively into said given surface area, said method comprising:

providing a consecutive supply of randomly dimensioned sheets to a delivery station, transferring from said delivery station said individual sheets which can be of random outline and area in non-contacting relation onto any of several congruent loading tables having said given surface area in such a manner that said sheets placed on any one of said loading tables are arranged as a group in an arrangement to cover at least a greater proportion of said given surface area than would be covered by consecutive sheets placed in consecutive order onto a single one of said loading tables, any sheets too large to fit within a group being placed onto another loading table, and transferring said group of sheets from said loading table to said treatment conveyor after said group is so arranged and without changing said arrangement.

2. The method as in claim 1, further including:

providing a cornering table in longitudinal alignment with each of said loading tables and in side-by-side relation to one another to provide a cross conveyor section in transverse alignment with other cross conveyor sections comprising other of said loading tables and other cornering tables, providing an end corner table in transverse alignment with said cornering tables at one transverse end of said cross conveyor sections and in longitudinal alignment with said treatment conveyor, further including:

transferring said group of sheets from said loading table onto its longitudinally aligned cornering table in a longitudinal direction and thence in a transverse direction along said cross conveyor sections to said end corner table and thence to said treatment conveyor without changing the arrangement with which said group was placed on any of said loading tables.

3. A method as in claim 2, wherein said selected one of said groups is transferred from said loading table to its longitudinally aligned cornering table in a direction opposite the direction of said longitudinal path through said treatment area.

4. A method as in claim 1, further including continuing to transfer sheets which can be of random outline and area on said several loading tables until said sheets placed on any one of said loading tables are arranged as a group in an arrangement to cover at least a greater proportion of said given surface area than would be covered by consecutive sheets placed in consecutive order onto a single one of said loading tables and transferring said group of glass sheets from said loading table to said treatment conveyor after said group is so arranged and without changing said arrangement.

5. A method as in claim 1, wherein said glass sheets are transferred onto said loading tables at a minimum spacing of 1 inch (2.5 cm) to 2 inches (5 cm) from adjacent glass sheets.

6. A method as in claim 5, wherein each said glass sheet is transferred onto any one of from two to six loading tables.

7. A method as in claim 6, wherein each glass sheet is transferred onto any one of four loading tables.

8. A method as in claim 1, wherein said sheets are composed of glass.

* * * * *